United States Patent
Chatterji et al.

(10) Patent No.: US 6,591,910 B1
(45) Date of Patent: Jul. 15, 2003

(54) METHODS AND COMPOSITIONS FOR CEMENTING SUBTERRANEAN ZONES

(75) Inventors: Jiten Chatterji, Duncan, OK (US); D. Chad Brenneis, Marlow, OK (US); Dennis W. Gray, Comanche, OK (US); Krista L. Keener, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/353,731

(22) Filed: Jan. 29, 2003

(51) Int. Cl.$^7$ ............................................. E21B 33/138
(52) U.S. Cl. ..................... 166/293; 106/725; 106/728; 106/809; 106/810; 106/823; 166/295; 507/227; 507/269; 524/5; 523/130
(58) Field of Search ................................ 166/292, 293, 166/294, 295; 106/725, 727, 728, 730, 805, 808, 809, 810, 823; 507/224, 269, 227; 523/130; 524/2, 5

(56) References Cited

U.S. PATENT DOCUMENTS

| | | |
|---|---|---|
| 3,359,225 A | 12/1967 | Weisend |
| 4,233,162 A | 11/1980 | Carney |
| 4,522,653 A | 6/1985 | Rao et al. |
| 4,557,763 A | 12/1985 | George et al. |
| 4,676,317 A | 6/1987 | Fry et al. ..................... 166/293 |
| 4,687,516 A | 8/1987 | Burkhalter et al. |
| 4,818,288 A | 4/1989 | Aignesberger et al. |
| 4,846,888 A | 7/1989 | Detroit |
| 4,870,120 A | 9/1989 | Tsubakimoto et al. .......... 524/5 |
| 4,963,190 A | 10/1990 | Mizunuma et al. ......... 106/724 |
| 4,972,025 A | 11/1990 | Tsubakimoto et al. ... 525/329.4 |
| 4,977,227 A | 12/1990 | Negami et al. .............. 527/400 |
| 5,179,170 A | 1/1993 | Ohtsu et al. ................. 525/285 |
| 5,221,343 A | 6/1993 | Grauer et al. ................ 106/729 |
| 5,263,797 A | 11/1993 | Lindstrom et al. .......... 405/266 |
| 5,287,929 A * | 2/1994 | Bloys et al. ................. 166/291 |
| 5,290,357 A | 3/1994 | Eoff ........................... 106/808 |
| 5,355,955 A * | 10/1994 | Rodrigues et al. .......... 166/293 |
| 5,389,706 A * | 2/1995 | Heathman et al. .......... 166/293 |
| 5,432,212 A | 7/1995 | Honda et al. ................... 524/4 |
| 5,651,817 A | 7/1997 | Yamato et al. .............. 106/809 |
| 5,874,387 A * | 2/1999 | Carpenter et al. ........... 507/228 |
| 6,174,980 B1 | 1/2001 | Hirata et al. ................. 526/320 |
| 6,182,758 B1 | 2/2001 | Vijn ........................... 166/293 |
| 6,187,841 B1 | 2/2001 | Tanaka et al. .................. 524/5 |
| 6,238,475 B1 | 5/2001 | Gargulak et al. ............ 106/725 |
| 6,268,406 B1 | 7/2001 | Chatterji et al. ............. 523/130 |
| 6,273,191 B1 * | 8/2001 | Reddy et al. ................ 166/293 |
| 6,376,581 B1 | 4/2002 | Tanaka et al. .................. 524/5 |
| 6,388,038 B1 | 5/2002 | Hirata et al. ................. 526/320 |
| 6,497,283 B1 * | 12/2002 | Eoff et al. .................... 166/293 |
| 2001/0020057 A1 * | 9/2001 | Audibert et al. ................ 524/2 |
| 2002/0099115 A1 * | 7/2002 | Shibai et al. ................... 524/2 |

* cited by examiner

*Primary Examiner*—George Suchfield
(74) *Attorney, Agent, or Firm*—Craig W. Roddy; C. Clark Dougherty, Jr.

(57) ABSTRACT

Methods and compositions for cementing subterranean zones penetrated by well bores are provided. The methods are basically comprised of the steps of providing a cement composition which comprises a hydraulic cement, sufficient water to form a slurry and a dispersing agent comprising a tetrapolymer formed of methacrylic acid, methacrylate, methallyl sulfonic acid and ethoxylated acrylic acid. The cement composition is placed in the subterranean zone to be cemented and allowed to set into an impermeable solid mass therein.

16 Claims, No Drawings

METHODS AND COMPOSITIONS FOR CEMENTING SUBTERRANEAN ZONES

BACKGROUND OF THE INVENTION

1. Field of the Invention

The present invention relates to improved methods and cement compositions for cementing subterranean zones penetrated by well bores.

2. Description of the Prior Art

Subterranean zones penetrated by well bores are commonly sealed by hydraulic cement compositions. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein which supports and positions the pipe string in the well bore and seals the exterior surfaces of the pipe string to the walls of the well bore. Hydraulic cement compositions are also utilized in a variety of cementing operations such as sealing highly permeable zones or fractures in subterranean zones, plugging cracks or holes in pipe strings and the like.

Dispersing agents are commonly included in hydraulic cement compositions used for cementing subterranean zones. The dispersing agents reduce the rheologies of the cement compositions, i.e., the apparent viscosities and other properties of the cement compositions, as well as reducing the water content of the cement compositions. The reduction of the rheology of a cement composition allows the cement composition to be pumped with less friction pressure which utilizes less pump horsepower. In addition, the lower rheology often allows the cement composition to be pumped in turbulent flow. Turbulent flow characteristics are desirable when pumping cement compositions in wells in that drilling fluid is more efficiently removed from surfaces in the well bore as the drilling fluid is displaced by the cement composition being pumped. The inclusion of dispersing agents in cement compositions is also desirable in that the presence of the dispersing agents reduces the water required for preparation of the cement compositions. Cement compositions having reduced water content set into cement masses having improved compressive strength.

A number of dispersing agents have heretofore been utilized in well cement compositions. For example, certain organic acids such as gluconic acid and citric acid have been utilized as cement dispersing agents. However, such organic acids suffer from the disadvantage that they also function as cement composition set retarding agents which is often undesirable. That is, the presence of an organic acid dispersant in a cement composition prevents the cement composition from setting for a longer period of time which is often costly or otherwise detrimental. Other dispersing agents which are commonly used in well cement compositions include polynaphthalene sulfonate which is commercially available under the trade designation "CFR-2™" from Halliburton Energy Services, Inc. of Duncan, Oklahoma; the condensation product of formaldehyde, acetone and a sulfite which is commercially available under the trade designation "CFR-3™" from Halliburton Energy Services, Inc.; poly-B-naphthol sulfonate; polymelamine sulfonate; and many others. While the heretofore utilized dispersing agents have been used successfully, they generally require relatively high concentrations in well cement compositions and impart some set retardation to the cement compositions in which they are utilized. Further, some of the heretofore utilized dispersing agents also deteriorate the fluid loss control properties of cement composition fluid loss control agents.

Thus, there are continuing needs for improved methods of cementing and cement compositions wherein the cement compositions include a dispersing agent which can be utilized in smaller amounts, does not impart significant retardation properties to cement compositions and does not deteriorate the fluid loss control properties of fluid loss control agents.

SUMMARY OF THE INVENTION

The present invention provides improved methods and compositions for cementing subterranean zones penetrated by well bores which meet the needs described above and overcome the deficiencies of the prior art. The cement compositions of this invention are comprised of a hydraulic cement, sufficient water to form a slurry and a dispersing agent comprised of a tetrapolymer formed of methacrylic acid, methacrylate, methallyl sulfonic acid and ethoxylated acrylic acid.

The methods of the invention for cementing a subterranean zone penetrated by a well bore comprise the steps of providing a cement composition which comprises a hydraulic cement, sufficient water to form a slurry and a dispersing agent comprising a tetrapolymer formed of methacrylic acid, methacrylate, methallyl sulfonic acid and ethoxylated acrylic acid, placing the cement composition in the subterranean zone to be cemented and allowing the cement composition to set into an impermeable solid mass therein.

The objects, features and advantages of the present invention will be readily apparent to those skilled in the art upon a reading of the description of preferred embodiments which follows.

DESCRIPTION OF PREFERRED EMBODIMENTS

As mentioned above, the well cement compositions of this invention are basically comprised of a hydraulic cement, sufficient water to form a slurry and a dispersing agent comprising a tetrapolymer formed of methacrylic acid, methacrylate, methallyl sulfonic acid and ethoxylated acrylic acid.

The methods of the present invention for cementing subterranean zones penetrated by a well bore are basically comprised of the following steps. A cement composition which comprises a hydraulic cement, sufficient water to form a slurry and a dispersing agent comprising a tetrapolymer formed of methacrylic acid, methacrylate, methallyl sulfonic acid and ethoxylated acrylic acid is provided. The cement composition is placed in a subterranean zone to be cemented and the cement composition is allowed to set into an impermeable solid mass therein.

The tetrapolymer dispersing agent includes methacrylic acid in an amount in the range of from about 50% to about 60% by weight of the tetrapolymer, methacrylate present in an amount of about 10% by weight of the tetrapolymer, methallyl sulfonic acid present in an amount of about 10% by weight of the tetrapolymer and ethoxylated acrylic acid present in an amount in the range of from about 20% to about 30% by weight of the tetrapolymer.

The ethoxylated acrylic acid in the tetrapolymer dispersing agent is ethoxylated within the range of from about 30 to about 120 moles of ethylene oxide. In a preferred tetrapolymer, the acrylic acid is ethoxylated with about 40 moles of ethylene oxide. In another preferred tetrapolymer, the acrylic acid is ethoxylated with about 100 moles of ethylene oxide.

A preferred tetrapolymer dispersing agent of this invention is comprised of methacrylic acid present in an amount of about 50% by weight of the tetrapolymer, methacrylate present in an amount of about 10% by weight of the tetrapolymer, methallyl sulfonic acid present in an amount of about 10% by weight of the tetrapolymer and acrylic acid ethoxylated with about 40 moles of ethylene oxide present in an amount of about 30% by weight of the tetrapolymer.

Another preferred tetrapolymer dispersing agent of this invention comprises methacrylic acid present in an amount of about 60% by weight of the tetrapolymer, methacrylate present in an amount of about 10% by weight of the tetrapolymer, methallyl sulfonic acid present in an amount of about 10% by weight of the tetrapolymer and acrylic acid ethoxylated with about 100 moles of ethylene oxide present in an amount of about 20% by weight of the tetrapolymer.

Examples of hydraulic cement which can be utilized in the cement compositions of this invention include, but are not limited to, Portland cements, slag cements, pozzolana cements, gypsum cements, aluminous cements and silica cements. Portland cements and their equivalents are generally preferred for use in accordance with the present invention. Portland cements of the types defined and described in API *Specification For Materials And Testing For Well Cements*, API Specification 10, $5^{th}$ Edition, dated Jul. 1, 1990 of the American Petroleum Institute are particularly preferred.

The water in the cement compositions can be fresh water or salt water. The term "salt water" is used herein to mean unsaturated salt solutions and saturated salt solutions including brines and seawater. The water is present in the cement compositions of this invention in amounts sufficient to form a pumpable slurry. Generally, the water is present in an amount in the range of from about 25% to about 100% by weight of hydraulic cement in the compositions.

The tetrapolymer dispersing agent is generally present in a cement compositions of this invention in an amount in the range of from about 0.01% to about 1% by weight of hydraulic cement therein, more preferably in an amount in the range of from about 0.01% to about 0.50%.

As mentioned above, the tetrapolymer dispersing agent of this invention is utilized in small quantities as compared to the quantities required by prior art dispersing agents, causes less set retardation and enhances the fluid loss control properties of fluid loss control agents included in the cement compositions.

An example of a fluid loss control agent, the properties of which are enhanced by the tetrapolymer dispersant is a copolymer of 2-acrylamido-2-methyl propane sulfonic acid and N,N'-dimethylacrylamide which is commercially available under the trade designation "HALAD-344™" by Halliburton Energy Services, Inc. of Duncan, Okla. The fluid loss control agent is generally present in the cement compositions in an amount in the range of from about 0.5% to about 2.0% by weight of the hydraulic cement therein.

A preferred method of this invention for cementing a subterranean zone penetrated by a well bore comprises the steps of: (a) providing a cement composition which comprises a hydraulic cement, sufficient water to form a slurry and a dispersing agent comprising a tetrapolymer formed of methacrylic acid, methacrylate, methallyl sulfonic acid and ethoxylated acrylic acid; (b) placing the cement composition in the subterranean zone to be cemented; and (c) allowing the cement composition to set into an impermeable solid mass therein.

A preferred composition of this invention comprises: a hydraulic cement; sufficient water to form a slurry; and a dispersing agent comprising a tetrapolymer formed of methacrylic acid, methacrylate, methallyl sulfonic acid and ethoxylated acrylic acid.

In order to further illustrate the methods and compositions of this invention, the following examples are given.

EXAMPLE 1

Test cement compositions having densities of 16.4 pounds per gallon were prepared containing fresh water, Joppa API Class H Portland cement and various dispersing agents. The dispersing agents utilized included a prior art dispersing agent comprised of the condensation product of formaldehyde, acetone and sodium bisulfite which is commercially available under the trade designation "CFR-3™" from Halliburton Energy Services, Inc. of Duncan, Okla. and two dispersing agents of the present invention. The first dispersing agent of the present invention designated herein as DA-1 was a tetrapolymer consisting of 50% by weight methacrylic acid, 10% by weight methacrylate, 10% by weight methallyl sulfonic acid and 30% by weight acrylic acid ethoxylated with 40 moles of ethylene oxide. The second dispersing agent designated as DA-2 was a tetrapolymer consisting of 60% by weight methacrylic acid, 10%,by weight methacrylate, 10% by weight methallyl sulfonic acid and 20% by weight of acrylic acid ethoxylated with 100 moles of ethylene oxide. The test cement compositions included the above described dispersing agents in amounts ranging from 0.05% to 1% by weight of cement in the cement compositions. The rheological properties of samples of the test compositions were determined using a Fann viscometer at temperatures of 80° F., 130° F. and 180° F. in accordance with the above mentioned API Specification RP10B. The results of the tests are given in Tables I-A, I-B and I-C below.

TABLE I-A

Rheological Properties Of Cements Including Dispersants At 80° F.

| Dispersing Agent, % by wt. of cement | Temp., °F. | Rheological Properties, rpm. | | | | | | | |
|---|---|---|---|---|---|---|---|---|---|
| | | 600 | 300 | 200 | 100 | 60 | 30 | 6 | 3 |
| 0 | 80 | 135 | 91 | 75 | 57 | 48 | 39 | 21 | 15 |
| "CFR-3 ™" - 0.05 | 80 | 120 | 66 | 54 | 39 | 32 | 26 | 17 | 12 |
| DA-1 - 0.05 | 80 | 62 | 25 | 15 | 7 | 4 | 2 | 0 | 0 |
| DA-2 - 0.05 | 80 | 70 | 29 | 17 | 8 | 5 | 2 | 0 | 0 |
| "CFR-3 ™" - 0.1 | 80 | 102 | 50 | 40 | 29 | 24 | 19 | 14 | 11 |
| DA-1 - 0.1 | 80 | 49 | 19 | 12 | 4 | 2 | 1 | 0 | 0 |
| DA-2 - 0.1 | 80 | 60 | 23 | 13 | 6 | 4 | 2 | 0 | 0 |
| "CFR-3 ™" - 0.5 | 80 | 84 | 38 | 27 | 13 | 7 | 4 | 1 | 1 |
| DA-1 - 0.5 | 80 | 70 | 29 | 18 | 8 | 4 | 2 | 0 | 0 |
| DA-2 - 0.5 | 80 | 59 | 24 | 15 | 6 | 3 | 2 | 0 | 0 |
| "CFR-3 ™" - 0.75 | 80 | 75 | 36 | 21 | 10 | 5 | 2 | 1 | 1 |
| DA-1 - 0.75 | 80 | 64 | 28 | 17 | 8 | 4 | 2 | 1 | 0 |
| DA-2 - 0.75 | 80 | 68 | 30 | 18 | 9 | 4 | 2 | 0 | 0 |
| "CFR-3 ™" - 1.0 | 80 | 71 | 31 | 17 | 9 | 5 | 2 | 1 | 1 |
| DA-1 - 1.0 | 80 | 73 | 32 | 19 | 9 | 5 | 2 | 0 | 0 |
| DA-2 - 1.0 | 80 | 67 | 30 | 19 | 9 | 5 | 2 | 0 | 0 |

TABLE I-B

Rheological Properties Of Cements Including Dispersants At 130° F.

| Dispersing Agent, % by wt. of cement | Temp., ° F. | Rheological Properties, rpm. | | | | | | | |
|---|---|---|---|---|---|---|---|---|---|
| | | 600 | 300 | 200 | 100 | 60 | 30 | 6 | 3 |
| 0 | 130 | 170 | 91 | 75 | 57 | 48 | 39 | 21 | 15 |
| "CFR-3 ™" - 0.05 | 130 | 167 | 123 | 107 | 87 | 76 | 57 | 26 | 17 |
| DA-1 - 0.05 | 130 | 65 | 35 | 25 | 16 | 13 | 10 | 7 | 7 |
| DA-2 - 0.05 | 130 | 70 | 39 | 29 | 20 | 16 | 12 | 9 | 8 |
| "CFR-3 ™" - 0.1 | 130 | 141 | 114 | 101 | 85 | 78 | 60 | 26 | 19 |
| DA-1 - 0.1 | 130 | 49 | 22 | 14 | 7 | 5 | 3 | 1 | 1 |
| DA-2 - 0.1 | 130 | 45 | 19 | 12 | 6 | 4 | 2 | 1 | 1 |
| "CFR-3 ™" - 0.5 | 130 | 63 | 21 | 12 | 6 | 3 | 2 | 0 | 0 |
| DA-1 - 0.5 | 130 | 50 | 18 | 11 | 5 | 3 | 1 | 0 | 0 |
| DA-2 - 0.5 | 130 | 38 | 16 | 10 | 4 | 2 | 1 | 0 | 0 |
| "CFR-3 ™" - 0.75 | 130 | 60 | 20 | 12 | 5 | 3 | 2 | 0 | 0 |
| DA-1 - 0.75 | 130 | 53 | 20 | 12 | 5 | 2 | 1 | 0 | 0 |
| DA-2 - 0.75 | 130 | 45 | 18 | 11 | 5 | 2 | 1 | 0 | 0 |
| "CFR-3 ™" - 1.0 | 130 | 63 | 21 | 12 | 6 | 3 | 1 | 0 | 0 |
| DA-1 - 1.0 | 130 | 51 | 23 | 14 | 6 | 4 | 1 | 0 | 0 |
| DA-2 - 1.0 | 130 | 51 | 19 | 11 | 5 | 3 | 1 | 0 | 0 |

TABLE I-C

Rheological Properties Of Cements Including Dispersants At 180° F.

| Dispersing Agent, % by wt. of cement | Temp., ° F. | Rheological Properties, rpm. | | | | | | | |
|---|---|---|---|---|---|---|---|---|---|
| | | 600 | 300 | 200 | 100 | 60 | 30 | 6 | 3 |
| 0 | 180 | 162 | 159 | 139 | 104 | 84 | 54 | 21 | 14 |
| "CFR-3 ™" - 0.05 | 180 | 135 | 134 | 120 | 95 | 78 | 46 | 15 | 10 |
| DA-1 - 0.05 | 180 | 74 | 43 | 35 | 26 | 22 | 20 | 13 | 10 |
| DA-2 - 0.05 | 180 | 90 | 45 | 36 | 26 | 22 | 19 | 12 | 9 |
| "CFR-3 ™" - 0.1 | 180 | 190 | 141 | 112 | 101 | 86 | 54 | 12 | 9 |
| DA-1 - 0.1 | 180 | 52 | 25 | 18 | 10 | 8 | 5 | 4 | 4 |
| DA-2 - 0.1 | 180 | 55 | 25 | 17 | 10 | 7 | 5 | 3 | 3 |
| "CFR-3 ™" - 0.5 | 180 | 40 | 13 | 9 | 3 | 1 | 0 | 0 | 0 |
| DA-1 - 0.5 | 180 | 35 | 10 | 6 | 3 | 2 | 1 | 0 | 0 |
| DA-2 - 0.5 | 180 | 31 | 10 | 3 | 2 | 1 | 0 | 0 | 0 |
| "CFR-3 ™" - 0.75 | 180 | 37 | 15 | 8 | 3 | 1 | 0 | 0 | 0 |
| DA-1 - 0.75 | 180 | 27 | 11 | 9 | 3 | 1 | 0 | 0 | 0 |
| DA-2 - 0.75 | 180 | 30 | 12 | 7 | 3 | 2 | 1 | 0 | 0 |
| "CFR-3 ™" - 1.0 | 180 | 38 | 16 | 9 | 3 | 1 | 0 | 0 | 0 |
| DA-1 - 1.0 | 180 | 34 | 15 | 8 | 4 | 2 | 0 | 0 | 0 |
| DA-2 - 1.0 | 180 | 37 | 12 | 8 | 3 | 2 | 1 | 0 | 0 |

From Tables I-A, I-B and I-C, it can be seen that the dispersing agents of the present invention, i.e., DA-1 and DA-2, produced better rheological properties at a concentration level of 0.1% by weight of cement than the prior art "CFR-3™" dispersing agent produced at a concentration of 1% by weight of cement.

EXAMPLE 2

Test cement compositions were prepared and tested as described in Example 1 except that sodium chloride salt or calcium chloride salt was added to the water and the cement compositions had densities of 17.0 or 16.7 pounds per gallon. Also, the prior art and inventive dispersing agents were added to the test cement composition samples in amounts of 1% by weight of cement in the test compositions. The rheological properties of the test cement compositions are set forth in Table II below.

TABLE II

Rheological Properties Of Cements Including Dispersants And Having Various Salt Concentrations At Various Temperatures

| Dispersing Agent, % by wt. of cement | Temp, ° F. | Salt (NaCl), % by wt. of water | Density, lb/gal | Rheological Properties, rpm. | | | | | | | |
|---|---|---|---|---|---|---|---|---|---|---|---|
| | | | | 600 | 300 | 200 | 100 | 60 | 30 | 6 | 3 |
| "CFR-3 ™" - 1.0 | 80 | 18 | 17 | 141 | 69 | 46 | 23 | 14 | 7 | 1 | 1 |
| DA-1- 1.0 | 80 | 18 | 17 | 150 | 64 | 41 | 18 | 10 | 4 | 1 | 0 |
| DA-2- 1.0 | 80 | 18 | 17 | 115 | 53 | 33 | 15 | 8 | 3 | 1 | 0 |
| "CFR-3 ™" - 1.0 | 130 | 18 | 17 | 92 | 47 | 31 | 16 | 9 | 5 | 1 | 0 |
| DA-1 - 1.0 | 130 | 18 | 17 | 77 | 35 | 21 | 9 | 5 | 2 | 1 | 0 |
| DA-2 - 1.0 | 130 | 18 | 17 | 71 | 28 | 18 | 8 | 4 | 2 | 0 | 0 |
| "CFR-3 ™" - 1.0 | 180 | 18 | 17 | 78 | 34 | 22 | 11 | 7 | 4 | 1 | 1 |
| DA-1- 1.0 | 180 | 18 | 17 | 80 | 29 | 26 | 17 | 12 | 9 | 5 | 4 |
| DA-2- 1.0 | 180 | 18 | 17 | 68 | 54 | 40 | 27 | 20 | 15 | 8 | 6 |
| "CFR-3 ™" - 1.0 | 80 | 37 | 16.7 | 71 | 55 | 36 | 18 | 11 | 6 | 1 | 1 |
| DA-1 - 1.0 | 80 | 37 | 16.7 | 81 | 40 | 26 | 12 | 7 | 3 | 1 | 2 |
| DA-2 - 1.0 | 80 | 37 | 16.7 | 82 | 40 | 26 | 13 | 8 | 4 | 2 | 1 |
| "CFR-3 ™" - 1.0 | 130 | 37 | 16.7 | 62 | 30 | 20 | 11 | 6 | 4 | 1 | 1 |
| DA-1 - 1.0 | 130 | 37 | 16.7 | 90 | 67 | 53 | 37 | 29 | 22 | 12 | 8 |
| DA-2 - 1.0 | 130 | 37 | 16.7 | 103 | 55 | 47 | 34 | 27 | 20 | 12 | 7 |
| "CFR-3 ™" - 1.0 | 180 | 37 | 16.7 | 53 | 23 | 15 | 8 | 5 | 2 | 1 | 1 |
| DA-1 - 1.0 | 180 | 37 | 16.7 | 171 | 100 | 84 | 60 | 43 | 36 | 9 | 6 |
| DA-2 - 1.0 | 180 | 37 | 16.7 | 180 | 106 | 91 | 72 | 52 | 39 | 11 | 9 |
| | | Salt (CaCl$_2$) | | | | | | | | | |
| "CFR-3 ™" - 1.0 | 80 | 2 | 17.0 | 176 | 87 | 56 | 28 | 16 | 8 | 2 | 1 |
| DA-1 - 1.0 | 80 | 2 | 17.0 | 132 | 54 | 33 | 15 | 8 | 4 | 1 | 0 |
| DA-2 - 1.0 | 80 | 2 | 17.0 | 120 | 56 | 38 | 18 | 12 | 7 | 4 | 4 |

From the rheological properties set forth in Table II, it can be seen that the dispersing agents of the present invention, DA-1 and DA-2, provide similar rheological properties as the prior art dispersant "CFR-3™" in cement compositions containing 18% sodium chloride by weight of the water in the test cement compositions. In the compositions wherein the water was saturated with sodium chloride salt (37% by weight of the water), it can be seen that the prior art dispersing agent "CFR-3™" out performs the dispersing agents of the present invention. However, in cement compositions containing calcium chloride at a level of 2% by weight of the water, the dispersing agents of the present invention at a concentration of 1% by weight of cement provide better performance than cement compositions containing the prior art "CFR-3™" dispersing agent in an amount of 1% by weight of cement.

EXAMPLE 3

Rheological data of densified test cement compositions prepared and tested as described in Example 1 except that the cement compositions had densities of 18.5 pounds per gallon, were obtained at a temperature of 80° F. The results of these tests are shown in Table III below.

TABLE III

Rheological Properties Of Densified Cements Including Dispersants

| Dispersing Agent, % by wt. of cement | Temp., ° F. | Rheological Properties, rpm. | | | | | | | |
|---|---|---|---|---|---|---|---|---|---|
| | | 600 | 300 | 200 | 100 | 60 | 30 | 6 | 3 |
| "CFR-3™" - 1.0 | 80 | 300+ | 300+ | 300+ | 143 | 77 | 34 | 5 | 2 |
| DA-1 - 0.2 | 80 | 300+ | 267 | 158 | 59 | 28 | 10 | 1 | 1 |
| DA-2 - 0.2 | 80 | 300+ | 202 | 122 | 46 | 21 | 8 | 1 | 1 |

The rheological properties shown in Table III illustrate that the dispersing agents of this invention produced superior rheological properties at concentrations of 0.2% by weight of densified cement than the prior art "CFR-3™" dispersing agent produced at a concentration of 1% by weight of densified cement.

EXAMPLE 4

Test high density cement compositions containing iron oxide weighting material and silica flour having densities of 19.5 pounds per gallon were prepared and tested as described in Example 1. The results of these tests are shown in Table IV below.

TABLE IV

Rheological Properties Of High Density Cements Including Dispersants

| Dispersing Agent, % by wt. of cement | Temp., F. | Rheological Properties, rpm. | | | | | | | |
|---|---|---|---|---|---|---|---|---|---|
| | | 600 | 300 | 200 | 100 | 60 | 30 | 6 | 3 |
| "CFR-3™" - 1.0 | 80 | 300+ | 300+ | 300+ | 235 | 135 | 63 | 9 | 4 |
| DA-1 - 0.1 | 80 | 300+ | 300+ | 300+ | 300+ | 156 | 78 | 18 | 11 |
| DA-2 - 0.1 | 80 | 300+ | 300+ | 300+ | 252 | 152 | 78 | 19 | 14 |
| DA-1 - 0.2 | 80 | 300+ | 300+ | 300+ | 112 | 53 | 19 | 2 | 1 |
| DA-2 - 0.2 | 80 | 300+ | 300+ | 256 | 99 | 48 | 28 | 2 | 1 |
| DA-1 - 0.3 | 80 | 300+ | 300+ | 250 | 95 | 44 | 16 | 2 | 1 |
| DA-2 - 0.3 | 80 | 300+ | 300+ | 300+ | 115 | 52 | 18 | 2 | 1 |

The rheological properties of the cement compositions containing the prior art dispersing agent "CFR-3™" and the dispersing agents of the present invention show that the presence of 0.3% by weight of cement of the dispersing agents of the present invention make the high density cement compositions easy to mix while a high density cement composition containing 1% of the prior art dispersing agent "CFR-3™" was difficult to mix.

EXAMPLE 5

Test cement compositions were again prepared and tested as indicated in Example 1 at a density of 16.4 pounds per gallon. Prior art fluid loss control additives were added to two groups of the test cement compositions at a concentration of 1% by weight of cement in the compositions. The prior art fluid loss control additives were "HALAD-344™" described previously herein and "HALAD-23™" which is hydroxyethylcellulose with 1.5 moles of ethylene oxide substitution and is also commercially available from Halliburton Energy Services, Inc. of Duncan, Okla.

TABLE V-A

Rheological Properties Of Cements Including Dispersants And Fluid Loss Control Agents

| Dispersing Agent, % by wt. of cement | "HALAD-23™", % by wt. of cement | Temp., ° F. | Rheological Properties, rpm. | | | | | | | |
|---|---|---|---|---|---|---|---|---|---|---|
| | | | 600 | 300 | 200 | 100 | 60 | 30 | 6 | 3 |
| "CFR-3™" - 0.5 | 1 | 80 | 300+ | 300+ | 300+ | 300+ | 300+ | 205 | 59 | 35 |
| DA-1 - 0.2 | 1 | 80 | 300+ | 300+ | 300+ | 300+ | 244 | 142 | 37 | 21 |
| DA-2 - 0.2 | 1 | 80 | 300+ | 300+ | 300+ | 300+ | 275 | 160 | 42 | 23 |
| "CFR-3™" - 0.5 | 1 | 130 | 300+ | 300+ | 300+ | 289 | 191 | 107 | 28 | 16 |
| DA-1 - 0.2 | 1 | 130 | 300+ | 300+ | 300+ | 256 | 162 | 87 | 19 | 10 |
| DA-2 - 0.2 | 1 | 130 | 300+ | 300+ | 300+ | 272 | 172 | 93 | 20 | 10 |
| "CFR-3™" - 0.5 | 1 | 180 | 300+ | 300+ | 300+ | 214 | 139 | 76 | 20 | 12 |
| DA-1 - 0.5 | 1 | 180 | 300+ | 300+ | 300+ | 172 | 105 | 55 | 17 | 6 |
| DA-2 - 0.5 | 1 | 180 | 300+ | 300+ | 300+ | 183 | 112 | 58 | 12 | 6 |

TABLE V-B

Rheological Properties Of Cements Including Dispersants And Fluid Loss Control Agents

| Dispersing Agent, % by wt. of cement | "HALAD-344 ™", % by wt. of cement | Temp., °F. | Rheological Properties, rpm. | | | | | | | |
|---|---|---|---|---|---|---|---|---|---|---|
| | | | 600 | 300 | 200 | 100 | 60 | 30 | 6 | 3 |
| "CFR-3 ™" - 0.5 | 1 | 80 | 300+ | 300+ | 300+ | 177 | 115 | 64 | 14 | 7 |
| DA-1 - 0.2 | 1 | 80 | 300+ | 300+ | 300+ | 182 | 120 | 67 | 15 | 7 |
| DA-2 - 0.2 | 1 | 80 | 300+ | 300+ | 300+ | 184 | 122 | 69 | 16 | 8 |
| "CFR-3 ™" - 0.5 | 1 | 130 | 300+ | 300+ | 284 | 157 | 101 | 54 | 12 | 6 |
| DA-1 - 0.2 | 1 | 130 | 300+ | 300+ | 285 | 166 | 110 | 62 | 15 | 8 |
| DA-2 - 0.2 | 1 | 130 | 300+ | 300+ | 300+ | 192 | 125 | 71 | 17 | 9 |
| "CFR-3 ™" - 0.5 | 1 | 180 | 300+ | 300+ | 245 | 138 | 89 | 49 | 11 | 6 |
| DA-1 - 0.2 | 1 | 180 | 300+ | 300+ | 300+ | 182 | 122 | 70 | 18 | 10 |
| DA-2 - 0.2 | 1 | 180 | 300+ | 300+ | 300+ | 210 | 142 | 83 | 22 | 12 |

From Tables V-A and V-B, it can be seen that 0.2% by weight of cement of the dispersing agents of the present invention produced better rheological properties in cement compositions containing "HALAD-23™" fluid loss control additive than the same cement compositions containing the prior art dispersing agent "CFR-3™" in an amount of 0.5% by weight of cement.

EXAMPLE 6

Test cement compositions were prepared as in Example 1 containing various amounts of the fluid loss control additives "HALAD-23™", "HALAD-344™" and "HALAD-9™". "HALAD-9 ™" is hydroxyethylcellulose with 2.5 moles of ethylene oxide substitution and is also commercially available from Halliburton Energy Services, Inc. of Duncan, Okla. The test cement composition samples were tested for fluid loss at 190° F. The results of these tests are given in Table VI.

TABLE VI

Fluid Loss From Cements Including Dispersants And Fluid Loss Control Additives

| Dispersing Agent, % by wt. of cement | Fluid Loss Control Agent, % by wt. of cement | Temp., °F. | Fluid Loss, cc/30 min API |
|---|---|---|---|
| "CFR-3 ™" - 0.66 | "HALAD-23 ™" - 0.33 | 190 | 190 |
| DA-1 - 0.66 | "HALAD-23 ™" - 0.33 | 190 | 235 |
| DA-2 - 0.66 | "HALAD-23 ™" - 0.33 | 190 | 396 |
| "CFR-3 ™" - 0.5 | "HALAD-23 ™" - 1 | 190 | 86 |
| DA-1 - 0.2 | "HALAD-23 ™" - 1 | 190 | 242 |
| DA-2 - 0.2 | "HALAD-23 ™" - 1 | 190 | 255 |
| "CFR-3 ™" - 0.5 | "HALAD-344 ™" - 1 | 190 | 28 |
| DA-1 - 0.2 | "HALAD-344 ™" - 1 | 190 | 20 |
| DA-2 - 0.2 | "HALAD-344 ™" - 1 | 190 | 20 |
| "CFR-3 ™" -1 | "HALAD-344 ™" - 1 | 190 | 173 |
| DA-1 - 1 | "HALAD-344 ™" - 1 | 190 | 40 |
| DA-2 - 1 | "HALAD-344 ™" - 1 | 190 | 20 |
| "CFR-3 ™" - 0.66 | "HALAD-9 ™" - 0.33 | 190 | 244 |
| DA-1 - 0.66 | "HALAD-9 ™" - 0.33 | 190 | 367 |
| DA-2 - 0.66 | "HALAD-9 ™" - 0.33 | 190 | 419 |

From Table VI it can be seen that none of the prior art or inventive dispersing agents had a significant effect on the fluid loss properties of "HALAD-23™" or "HALAD-9™". However, when the fluid loss control properties of "HALAD-344™" were measured in the presence of the three dispersing agents, measurable differences in the fluid loss were observed. Increasing the concentration of the prior art CFR-3 dispersing agent resulted in higher fluid loss with "HALAD-344™" fluid loss control additive. On the other hand, increasing the concentration of either of the dispersing agents of the present invention provided excellent fluid loss control as compared to the prior art dispersing agent "CFR-3™".

EXAMPLE 7

Test cement compositions having a density of 17 lb/gal were prepared as described in Example 1. The thickening times of the cement compositions containing the dispersing agents of the present invention and the prior art dispersing agent "CFR-3™" were tested for thickening time at 125° F. The results of these tests are shown in Table VII.

TABLE VII

Thickening Time Tests

| Dispersing Agent, % by wt. of cement | Salt (NaCl), % by wt. of cement | Temp., °F. | Thickening Time, hr:min |
|---|---|---|---|
| "CFR-3 ™" - 1.0 | 0 | 125 | 7:05 |
| DA-1 - 0.1 | 0 | 125 | 2:39 |
| DA-2 - 0.2 | 0 | 125 | 5:10 |
| "CFR-3 ™" - 0.75 | 18 | 125 | 4:12 |
| DA-1 - 0.75 | 18 | 125 | 28:49 |
| DA-1 - 0.75 | 18 | 125 | 24:16 |

From Table VII it can be seen that long thickening times are caused by the dispersing agents of the present invention at concentrations of 0.75% by weight of cement in the cement composition. While the test cement composition sample containing the prior art "CFR-3™" dispersing agent caused a relatively short set retardation, when small concentrations of the dispersing agents of the present invention were used to disperse the cement, the set retardation properties observed were comparable to those caused by the prior art "CFR-3™" dispersing agent.

EXAMPLE 8

Test cement compositions having a density of 18 lb/gal were prepared as described in Example 1. The compressive strengths of the test cement compositions including the dispersing agents of the present invention and the prior art "CFR-3™" dispersing agent were determined at 140° F. The results of these tests are shown in Tables VIII-A and VIII-B.

TABLE VIII-A

Compressive Strength Tests

| Dispersing Agent, % by wt. of cement | Temp., °F. | Crushed Compressive Strength (psi) | |
|---|---|---|---|
| | | 24 Hr, psi | 48 Hr, psi |
| "CFR-3 ™" - 0.5 | 140 | 7037.7 | 8446.5 |
| DA-1 - 0.1 | 140 | 5474.3 | 6774.5 |
| DA-2 - 0.1 | 140 | 4825.8 | 6554.9 |

TABLE VIII-B

Compressive Strength Tests

| Dispersing Agent, % by wt. of cement | Temp., °F. | Compressive Strengths on UCA | | |
|---|---|---|---|---|
| | | 12 Hr | 24 Hr | 72 Hr |
| "CFR-3 ™" - 0.5 | 140 | 4891 | 6413 | 7800 |
| DA-2 - 0.1 | 140 | 5698 | 7413 | 9385 |

From Tables VIII-A and VIII-B, it can be seen that 0.1 % by weight of cement of a dispersing agent of the present invention produced higher 12 hr., 24 hr. and 72 hr. compressive strengths than the prior art "CFR-3™" dispersing agent at a concentration of 0.5% by weight of cement.

From the data produced in Examples 1–8, it is clearly shown that the dispersing agents of this invention perform better than the prior art dispersing agent "CFR-3 ™" in all areas. Generally, the dispersing agents of the present invention require approximately 10 times less concentration to provide the same results as the prior art dispersing agent "CFR-3™".

Thus, the improved methods and composition of this invention are well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a subterranean zone comprising the steps of:
    (a) providing a cement composition which comprises a hydraulic cement, sufficient water to form a slurry and a dispersing agent comprising a tetrapolymer formed of methacrylic acid, methacrylate, methallyl sulfonic acid and ethoxylated acrylic acid;
    (b) placing said cement composition in said subterranean zone to be cemented; and
    (c) allowing said cement composition to set into therein.

2. The method of claim 1 wherein said methacrylic acid is present in said tetrapolymer in an amount in the range of from about 50% to about 60% by weight of said tetrapolymer.

3. The method of claim 1 wherein said methacrylate is present in said tetrapolymer in an amount of about 10% by weight of said tetrapolymer.

4. The method of claim 1 wherein said methallyl sulfonic acid is present in said tetrapolymer in an amount of about 10% by weight of said tetrapolymer.

5. The method of claim 1 wherein said acrylic acid in said tetrapolymer is ethoxylated with in the range of from about 30 to about 120 moles of ethylene oxide.

6. The method of claim 1 wherein said acrylic acid in said tetrapolymer is ethoxylated with about 40 moles of ethylene oxide.

7. The method of claim 1 wherein said acrylic acid in said tetrapolymer is ethoxylated with about 100 moles of ethylene oxide.

8. The method of claim 1 wherein said ethoxylated acrylic acid is present in said tetrapolymer in an amount in the range of from about 20% to about 30% by weight of said tetrapolymer.

9. The method of claim 1 wherein said hydraulic cement in said cement composition is selected from the group consisting of Portland cements, slag cements, pozzolana cements, gypsum cements, alumina cements and silica cements.

10. The method of claim 1 wherein said hydraulic cement in said cement composition is Portland cement.

11. The method of claim 1 wherein said water in said cement composition is selected from the group consisting of fresh water and salt water.

12. The method of claim 1 wherein said water is present in said cement composition in an amount in the range of from about 25% to about 100% by weight of cement therein.

13. The method of claim 1 wherein said tetrapolymer dispersing agent is present in said cement composition in an amount in the range of from about 0.01% to about 1% by weight of cement therein.

14. The method of claim 1 wherein said cement composition further comprises a fluid loss control agent selected from the group consisting of a copolymer of 2-acrylamido-2-methyl propane sulfonic acid and N,N'-dimethylacrylamide and hydroxyethylcellulose with 1.5 moles of ethylene oxide substitution.

15. The method of claim 14 wherein said fluid loss control agent is a copolymer of 2-acrylamido-2-methyl propane sulfonic acid and N,N'-dimethylacrylamide.

16. The method of claim 14 wherein said fluid loss control agent is present in said cement composition in an amount in the range of from about 0.5% to about 2% by weight of cement therein.

* * * * *